United States Patent [19]

Sugiura et al.

[11] Patent Number: 5,702,749
[45] Date of Patent: Dec. 30, 1997

[54] PROCESS FOR PREPARING POWDERED SEASONINGS

[75] Inventors: Masahisa Sugiura; Kazuhiro Okada, both of Tsu; Sadao Nagata, Saitama-ken, all of Japan

[73] Assignee: Nisshin Flour Milling Co., LTD., Tokyo, Japan

[21] Appl. No.: 608,197

[22] Filed: Feb. 28, 1996

[30] Foreign Application Priority Data

Mar. 16, 1995 [JP] Japan .................................. 7-056893

[51] Int. Cl.⁶ .................. A23J 3/00; A23L 3/3463; A23L 1/0562; A23L 1/238
[52] U.S. Cl. .................. 426/638; 426/648; 426/471; 426/650; 426/576; 426/654; 426/268; 127/32; 127/71; 127/38
[58] Field of Search .................. 426/638, 648, 426/471, 650, 578, 654, 268; 127/32, 71, 38

[56] References Cited

FOREIGN PATENT DOCUMENTS

| 55-36 | 1/1980 | Japan . |
| 55-21725 | 2/1980 | Japan . |
| 55-64764 | 5/1980 | Japan . |
| 57-99187 | 6/1982 | Japan . |
| 57-189672 | 11/1982 | Japan . |
| 59-205958 | 11/1984 | Japan . |

OTHER PUBLICATIONS

Takahashi et al Patent Abstracts of Japan vol. 13, No. 399 (9/81).

*Primary Examiner*—Donald E. Czaja
*Assistant Examiner*—Choon P. Koh
*Attorney, Agent, or Firm*—Oblon, Spivak, McClelland, Maier & Neustadt, P.C.

[57] ABSTRACT

Disclosed is a process for preparing a powdered seasoning, which comprises adding to and dissolving in a seasoning liquor or soy sauce, 100–250% by weight in total of a dextrin of DE value 6–15 and a dextrin of DE value 1–5 and 3–20% by weight of gelatin, and then spray-drying the resultant solution, a content of the DE 1–5 dextrin being 5–60% by weight of the total dextrin, all the percent weights being based on the weight of a solid in the seasoning liquor or soy sauce.

1 Claim, No Drawings

PROCESS FOR PREPARING POWDERED SEASONINGS

FIELD OF THE INVENTION

This invention relates to a process for preparing a powdered seasoning. More particularly, this invention is concerned with a process for preparing a powdered seasoning, which permits easy powdering without any adverse effect on a delicate or complex flavor of a seasoning liquor or soy sauce and can also prevent the resultant powdered product from blocking due to moisture absorption and unfavorable deteriorations such as browning and so on.

BACKGROUND OF THE INVENTION

The powdered products prepared by spray drying tend to be hygroscopic. As a result of moisture absorption, the powders adhere each other to lose flowability and then aggregate to cause a blocking, deliquescence and liquefaction, with the loss of all characteristics of powdered products.

There is much difficulty in powder-drying of soy sauce or a seasoning liquor containing complex flavor components and further containing a large amount of reducing sugars, proteins, peptides, amino acids, organic acids, salts and the like. The dried powders thus prepared are remarkable in hygroscopicity. Thus, an improved method for drying has been desired. A spray drying process is known which comprises adding dextrin, corn syrup, soluble starch natural gums such as guar gum or locust bean gum as an excipient. However, powdered dextrin or corn syrup has the drawbacks of a high viscosity and easier aging. Soluble starch or natural gums have the problems that they have a poor solubility and a high viscosity and also are difficult to dry at a higher concentration, thus providing a higher drying cost and further an unfavorable taste and off-flavor to the products.

Various processes for preparing a powdered dry product having low hygroscopicity are known. For instance, the processes of adding dextrin or a dextrin of low DE value have been proposed by Japanese Patent Kokai 57-189672, 55-36 and 57-99187. Those processes are directed to the preparation of fruit juice powders or wine powder of high essence content in which the subject to be powdered is restricted to fruit juice or wine of high essence content. However, there is no reference to the powdering of soy sauce or a seasoning liquor containing a large amount of reducing sugars, proteins, peptides, amino acids, organic acids or salts, which are different in composition, browning and flavor from fruit juice and wine. If powdering of soy sauce or a seasoning liquor is attempted under the above prior art conditions, the problems of hygroscopicity, aggregation or browning may remain.

Japanese Patent Kokai 59-20598 has proposed a process for powdering an aqueous extract of fish and/or animal meat which includes dissolving a dextrin of low dextrose equivalent (DE value 2–5) in the aqueous extract, followed by drying. For the material to be powdered, this process uses an aqueous extract of fish and/or animal meat which has a lower content of reducing sugars, proteins, amino acids, organic acids or salts as compared with soy sauce or a seasoning liquor. If the above prior process is applied to the powdering of soy sauce or a seasoning liquor, it is difficult to accomplish a desired powdering with the increase in hygroscopicity and browning, by which satisfactory powdered products cannot be produced. The problems remain that the powdered products may retain a flavor with a strong starchy smell with the loss of an aroma peculiar to soy sauce or a seasoning liquor, since powdering should be performed by increasing the content of the low DE dextrin.

Further, Japanese Patent Kokai 55-21725 has proposed a process for powdering soy sauce or seasoning which includes mixing soy sauce or seasoning with a mixture of a cyclodextrin and a dextrin of 5–40 DE value in such a ratio that the DE value of the mixture is below 25 and drying the mixture. According to this process, the powdered product is free from any paste smell or unfavorable taste and off-flavor. However, the production cost is higher and the solubility of the powdered product is lower, since a ratio of the cyclic dextrin in all dextrins should be 20–50% by weight.

Japanese Patent Kokai 55-64764 has proposed a process of powdering an acid hydrolysed solution of animal protein which comprises adding 3–10% by weight of gelatin to the hydrolysed solution, optionally with a small amount of an additive such as dextrin and spray-drying the mixture. However, this process is not applicable to the powdering of the fermented product having high hyroscopicity and peculiar flavor, such as soy sauce or a seasoning liquor, since the addition of only gelatin lacks in the amount of excipient and the peculiar flavor cannot be retained. Further, the addition of gelatin and optionally a small amount of dextrin cannot prevent soy sauce or seasoning liquor of high hyroscopicity from blocking and deterioration in flavor. Moreover, no specific reference is made on the specific ratio of gelatin and dextrin added.

Accordingly, a process is not known wherein a high hygroscopic soy sauce or a seasoning liquor containing complex flavor components and further containing reducing sugars, proteins, peptides, amino acids, organic acids or salts in a large amount is powdered without loss of its peculiar flavor, preventing the powdered product from the hyroscopicity and browning.

DETAILED DESCRIPTION OF THE INVENTION

In view of such circumstances, the present inventors have made extensive studies in an effort to solve the above-mentioned problems and found that soy sauce or seasoning can be powdered without loss of its peculiar flavor by adding to soy sauce or seasoning, a dextrin of DE value 6–15, a dextrin of DE value 1–5 and gelatin at a specified ratio, followed by spray-drying, while effectively preventing the powdered product from hyroscopicity, aggregation, unfavorable alteration such as discoloration or unfavorable taste and smell.

Thus, the present invention provides a process for preparing a powdered seasoning, which comprises adding to and dissolving in a seasoning liquor or soy sauce, 100–250% by weight in total of a dextrin of DE value 6–15 and a dextrin of DE value 1–5 and 3–20% by weight of gelatin, and then spray-drying the resultant solution, a content of the DE 1–5 dextrin being 5–60% by weight of the total dextrin, all the percent weights being based on the weight of a solid in the seasoning liquor or soy sauce.

The soy sauce which can be used in the invention is preferably a fermented soy sauce with good flavor, which includes any type of soy sauces such as "Koikuchi shoyu", "Usukuchi shoyu", "Shiro shoyu", pasteurized soy sauce, raw soy sauce and the like. The seasoning liquor which can be used in the invention includes any of other soy sauces not meeting the requirements for the starting materials, color numbers, nitrogen contents and the like as prescribed in the JAS (Japanese Agricultural Standard) for soy sauce, fermented fish sauces, Mirin-like seasoning liquors, enzymatic hydrolyzates of animal or vegetable proteins and the like.

The term "DE" as used herein is the value indicating an amount of direct reducing sugar (expressed in terms of glucose) in all solid materials. The dextrin of DE value 6–15 is obtained by partially hydrolysing the starch composed exclusively of amylose such as corn starch or potato starch with an alpha-amylase to a predetermined degree of the DE value. The dextrin of DE value 1–5 is obtained from partial hydrolysis of the starch composed mainly of amylopectin such as waxy corn starch, tapioca starch and glutinous rice with an alpha-amylase to a predetermined degree of the DE value. If the DE value is more than 15, the browning rate of the resultant powdered product is faster. This is not desirable. Gelatin can include any type prepared from animal bones and hides.

In this invention, it is very important for achieving the object of the invention that a dextrin of DE value 6–15 and a dextrin of DE value 1–5 are added at 100–250% by weight in total and a content of a dextrin of DE value 1–5 in the total dextrin is 5–60% by weight, based on the weight of a solid in soy sauce or a seasoning liquor and gelatin is added at 3–20% by weight, based on the weight of a solid in soy sauce or a seasoning liquor. With less than 100% by weight of dextrin in total, powdering becomes difficult. Even if powdered, blocking of the powdered product is remarkable. With more than 250% by weight, a viscosity of the solution as prepared prior to powdering increases and powdering becomes difficult with the formation of a cottony (not granular) product and with a remarkably increased browning. If the content of a dextrin of DE value 1–5 in the total dextrin is less than 5% by weight, powdering becomes difficult and the effect of preventing a blocking is reduced with more than 60% by weight, the resulting powdered product will be undesirably cottony and give a starchy smell.

If an amount of the gelatin added is less than 3% by weight, powdering will be difficult. With more than 20% by weight, a viscosity of the solution as prepared prior to powdering will increase, so that it is not feasible to granulate the product and an offensive smell of gelatin exerts a remarkably bad effect on flavor of the product.

If desired, the salts may be added within the range of up to 10% by weight based on the solid weight of soy sauce or seasoning liquor, depending on the salt concentration thereof, in order to further improve a powdering property and prevent blocking and browning.

In one embodiment of the present process, a powdered seasoning can be prepared by adding to and dissolving in a seasoning liquor or soy sauce a dextrin of DE value 6–15, a dextrin of DE value 1–5 and gelatin at the specified ratio and spray-drying the resultant solution in a conventional manner, for example, under the conditions of a hot air temperature of 150°–190° C., an outlet temperature of 85°–95° C. and a feed rate of 250–550 liters/hr. This invention is further illustrated by the following examples and test examples.

EXAMPLE 1

100 kg of defatted soybean were charged with 120 liters of water and steamed. 300 kg of roasted wheat in parched size were added to the steamed soybean from which soluble sugars and proteins had been removed while washing with hot water at 50° C. The mixture was subjected to koji-making, fermentation and squeezing in a conventional manner to produce a fermented, pale colored seasoning liquor having a high alcohol content. To 300 liters of the seasoning liquor (solid concentration: 33.3% by weight, solid weight: 100 kg) were added and dissolved 200 kg of a dextrin of DE value 6–15, 20 kg of a dextrin of DE value 1–5 and 4 kg of gelatin. The resultant solution was spray dried at a hot air temperature of 165° C., an outlet temperature of 90° C. and a feed rate of 300 liters/hr.

The powdered seasoning thus prepared was granular and had a pale color, an aroma and good solubility without unfavorable deterioration such as blocking with moisture absorption, browning and so on.

EXAMPLE 2

200 kg of wheat gluten was steamed, 100 kg of roasted wheat in parched size was admixed and the mixture was subjected to koji-making, fermentation and squeezing in a conventional manner to prepare a fermented, pale colored seasoning liquor having a good flavor and a high content of amino acids and peptides. To 250 liters of the seasoning liquor (solid concentration: 40% by weight, solid weight: 100 kg) were added and dissolved 110 kg of a dextrin of DE value 6–15, 20 kg of a dextrin of DE value 1–5 and 18 kg of gelatin. The resultant solution was spray-dried at a hot air temperature of 170° C., an outlet temperature of 95° C. and a feed rate of 300 liters/hr.

The powdered seasoning thus prepared was granular and had a pale color, good aroma and good solubility without unfavorable deteriorations such as blocking with moisture absorption, browning and so on.

EXAMPLE 3

To 2000 liters of "Koikuchi shoyu" (solid concentration: 40% by weight, solid weight: 500 kg) were added and dissolved 750 kg of a dextrin of DE value 6–15, 70 kg of a dextrin of DE value 1–5 and 10 kg of gelatin. The resultant solution was spray-dried at a hot air temperature of 170° C., an outlet temperature of 90° C. and a feed rate of 400 liters/hr.

The powdered seasoning thus prepared was granular, had a peculiar aroma and good solubility without unfavorable deteriorations such as blocking with moisture absorption, browning and so on.

EXAMPLE 4

To 1500 liters of the fermented seasoning liquor (solid concentration: 35% by weight, solid weight: 525 kg) obtained by blending 900 liters of "Usukuchi shoyu" with 600 liters of "Mirin" were added and dissolved 300 kg of a dextrin of DE value 6–15, 320 kg of a dextrin of DE value 1–5 and 50 kg of gelatin. The resultant solution was spray-dried at a hot air temperature of 180° C., an outlet temperature of 90° C. and a feed rate of 500 liters/hr.

The powdered seasoning thus prepared was granular and had peculiar aroma and good solubility without unfavorable deteriorations such as blocking with moisture absorption, browning and so on.

EXAMPLE 5

To 300 liters of a fermented fish sauce (solid concentration: 33% by weight, solid weight: 100 kg) were added and dissolved 190 kg of a dextrin of DE value 6–15, 20 kg of a dextrin of DE value 1–5 and 3 kg of gelatin. The resultant solution was spray-dried at a hot air temperature of 155° C., an outlet temperature of 90° C. and a feed rate of 200 liters/hr.

The powdered seasoning thus prepared was granular and had peculiar aroma and good solubility without unfavorable deteriorations such as blocking with moisture absorption, browning and so on.

TEST EXAMPLE 1

100 kg of defatted soybean were charged with 120 liters of water and steamed. 300 kg of roasted wheat in parched size were added to the steamed soybean from which soluble sugars and proteins had been removed while washing with hot water at 50° C. The mixture was subjected to koji-making, fermentation and squeezing in a conventional manner to produce a fermented, pale colored seasoning liquor having a high alcohol content. To 300 liters of the seasoning liquor (solid concentration: 33.3% by weight) were added and dissolved a dextrin of DE value 6–15, a dextrin of DE value 1–5 and gelatin in the respective proportions shown in Table 1. The resultant solution was spray dried at a hot air temperature of 160° C., an outlet temperature of 90° C. and a feed rate of 400 liters/hr. The powdered product was evaluated for powdering, blocking, browning and flavor. The results are shown in Table 1.

In the evaluation, the state of powdering was rated with the following marks:

○: well-arranged granules

X: badly-arranged granules

The degree of blocking was determined by sealing 100 g of the powdered product into a laminated pack, allowing to stand at a relative humidity of 45% at 37° C. for 2 weeks and then measuring a residual ratio (% by weight) over a 32 mesh sieve, with the following ratings:

X: 30% or more residual ratio, with many occurrences of blocking Δ: 10–30% residual ratio, with occurrence of blocking ○: Less than 10% residual ratio, with substantially no occurrence of blocking The degree of browning was determined by placing 5 g of the powdered sample on a stainless steel plate, exposing the sample to light at height of 5 cm from the sample for 3 minutes with the following ratings:

X: Strong browning

Δ: Slight browning

○: No substantial change

The desirable flavor was evaluated with the following ratings:

X: Poor

Δ: Slightly poor

○: Good

TABLE 1

|  | Test No. | | | |
| --- | --- | --- | --- | --- |
|  | 1 | 2 | 3 | 4 |
| Starting materials | | | | |
| Seasoning liquor (liter) | 300 | 300 | 300 | 300 |
| (solid content kg) | (100) | (100) | (100) | (100) |
| Dextrin (kg) A | 150 | 0 | 120 | 120 |
| (DE value 6–15) | | | | |
| Dextrin (kg) B | 0 | 150 | 30 | 30 |
| (DE value 1–5) | | | | |
| A + B (kg) | 150 | 150 | 150 | 150 |
| B/(A + B) (%) | 0 | 100 | 20 | 20 |
| Gelatin (kg) | 5 | 5 | 5 | 0 |
| Evaluation | | | | |
| State of powdering | ○ | × | ○ | ○ |
| Degree of blocking | × | ○ | ○ | × |
| Degree of browning | × | × | ○ | × |
| Flavor | ○ | × | ○ | ○ |

As shown in Table 1, it can be seen that a good powdering, less blocking and browning and a satisfactory flavor can be first attained by adding and dissolving all three components, a dextrin of DE value 6–15, a dextrin of DE value 1–5 and gelatin and then powdering.

TEST EXAMPLE 2

The test and evaluation were carried out in the same manner as described in Test Example 1, except that the amounts of a dextrin of DE value 6–15, a dextrin of DE value 1–5 and gelatin added were varied as indicated in Table 2. The results are shown in Table 2.

TABLE 2

|  | Test No. | | | | |
| --- | --- | --- | --- | --- | --- |
|  | 1 | 2 | 3 | 4 | 5 |
| Starting materials | | | | | |
| Seasoning liquor (liter) | 300 | 300 | 300 | 300 | 300 |
| (solid content kg) | (100) | (100) | (100) | (100) | (100) |
| Dextrin (kg) A | 64 | 80 | 120 | 200 | 208 |
| (DE value 6–15) | | | | | |
| Dextrin (kg) B | 16 | 20 | 30 | 50 | 52 |
| (DE value 1–5) | | | | | |
| A + B (kg) | 80 | 100 | 150 | 250 | 260 |
| B/(A + B) (%) | 20 | 20 | 20 | 20 | 20 |
| Gelatin (kg) | 5 | 5 | 5 | 5 | 5 |
| Evaluation | | | | | |
| State of powdering | × | ○ | ○ | ○ | ○ |
| Degree of blocking | × | ○ | ○ | ○ | ○ |
| Degree of browning | × | ○ | ○ | ○ | × |
| Flavor | ○ | ○ | ○ | ○ | × |

TEST EXAMPLE 3

The test and evaluation were carried out in the same manner as described in Test Example 1, except that the amounts of a dextrin of DE value 6–15, a dextrin of DE value 1–5 and gelatin added were varied as indicated in Table 3. The results are shown in Table 3.

TABLE 3

|  | Test No. | | | | |
| --- | --- | --- | --- | --- | --- |
|  | 1 | 2 | 3 | 4 | 5 |
| Starting materials | | | | | |
| Seasoning liquor (liter) | 300 | 300 | 300 | 300 | 300 |
| (solid content kg) | (100) | (100) | (100) | (100) | (100) |
| Dextrin (kg) A | 145.5 | 142.5 | 105 | 60 | 45 |
| (DE value 6–15) | | | | | |
| Dextrin (kg) B | 4.5 | 7.5 | 45 | 90 | 105 |
| (DE value 1–5) | | | | | |
| A + B (kg) | 150 | 150 | 150 | 150 | 150 |
| B/(A + B) (%) | 3 | 5 | 30 | 60 | 70 |
| Gelatin (kg) | 5 | 5 | 5 | 5 | 5 |
| Evaluation | | | | | |
| State of powdering | ○ | ○ | ○ | ○ | × |
| Degree of blocking | × | ○ | ○ | ○ | ○ |
| Degree of browning | × | ○ | ○ | ○ | × |
| Flavor ○ | ○ | ○ | ○ | × | × |

TEST EXAMPLE 4

The test and evaluation were carried out in the same manner as described in Test Example 1, except that the amounts of a dextrin of DE value 6–15, a dextrin of DE value 1–5 and gelatin added were varied as indicated in Table 4. The results are shown in Table 4.

TABLE 4

|  | \multicolumn{5}{c}{Test No.} |
| --- | --- | --- | --- | --- | --- |
|  | 1 | 2 | 3 | 4 | 5 |
| Starting materials |  |  |  |  |  |
| Seasoning liquor (liter) | 300 | 300 | 300 | 300 | 300 |
| (solid content kg) | (100) | (100) | (100) | (100) | (100) |
| Dextrin (kg) A (DE value 6–15) | 135 | 135 | 135 | 135 | 135 |
| Dextrin (kg) B (DE value 1–5) | 15 | 15 | 15 | 15 | 15 |
| A + B (kg) | 150 | 150 | 150 | 150 | 150 |
| B/(A + B) (%) | 10 | 10 | 10 | 10 | 10 |
| Gelatin (kg) | 2 | 3 | 10 | 20 | 25 |
| Evaluation |  |  |  |  |  |
| State of powdering | ○ | ○ | ○ | ○ | × |
| Degree of blocking | × | ○ | ○ | ○ | ○ |
| Degree of blowning | × | ○ | ○ | ○ | × |
| Flavor | ○ | ○ | ○ | ○ | × |

From Test Examples 1–4, it is evident that a good powdering, less blocking and browning and a satisfactory flavor can be attained only by the present process set forth in the claims. Accordingly, the powdered seasonings produced by the present process can retain a delicate and good flavor peculiar to a seasoning liquor or soy sauce and they are free from unfavorable alteration in quality due to blocking with moisture absorption or browning.

What is claimed is:

1. A process for preparing a powdered seasoning, comprising:
    (a) dissolving in a seasoning liquor or soy sauce containing solids:
        100 to 250% by weight, in total, of a dextrin having a DE value of 1 to 5 and a dextrin having a DE value of 6–15, wherein the dextrin having a DE value of 1 to 5 comprises 5 to 60% by weight of the total amount of the dextrin; and
        3 to 20% by weight of gelatin,
        wherein the weight percent of the total dextrin and the gelatin is based on the solids content of the seasoning liquor or soy sauce; and
    (b) spray-drying the resulting solution.

* * * * *